United States Patent
Chapman et al.

(10) Patent No.: US 6,501,384 B2
(45) Date of Patent: Dec. 31, 2002

(54) ELECTRONIC CANDY AND OIL THERMOMETER

(75) Inventors: Peter A. Chapman, Avon By The Sea, NJ (US); Hughes Sanoner, Hong Kong (CN)

(73) Assignee: Solar Wide Industrial Ltd., Tsuen Wan (CN)

( * ) Notice: Subject to any disclaimer, the term of this patent is extended or adjusted under 35 U.S.C. 154(b) by 50 days.

(21) Appl. No.: 09/880,460

(22) Filed: Jun. 13, 2001

(65) Prior Publication Data
US 2002/0150144 A1 Oct. 17, 2002

Related U.S. Application Data
(60) Provisional application No. 60/283,503, filed on Apr. 12, 2001.

(51) Int. Cl.[7] ............................................. G08B 17/00
(52) U.S. Cl. .................... 340/584; 340/517; 340/520; 340/588; 99/342; 99/343; 99/344; 374/208; 374/101; 374/102; 374/104; 374/155; 374/151; 374/170
(58) Field of Search ......................... 340/584, 517, 340/520, 588; 99/342, 343, 344; 374/208, 101, 102, 104, 155, 151, 170

(56) References Cited

U.S. PATENT DOCUMENTS

| | | | |
|---|---|---|---|
| 3,636,770 A | 1/1972 | Chaney | 73/376 |
| 4,083,250 A * | 4/1978 | Goff et al. | 73/352 |
| 5,983,783 A | 11/1999 | Archard et al. | 99/342 |
| 6,000,845 A * | 12/1999 | Tymkewicz et al. | 374/155 |
| 6,065,391 A | 5/2000 | Archard et al. | 99/342 |
| 6,293,700 B1 * | 9/2001 | Lund et al. | 374/181 |

* cited by examiner

Primary Examiner—Daniel J. Wu
Assistant Examiner—Tai T. Nguyen

(57) ABSTRACT

An electronic candy and oil thermometer includes a housing having a visual display for displaying indicia associated with a plurality of candy cooking stages and a plurality of fried foods. The housing includes a controller having operating protocols and a memory for storing predetermined optimal temperature ranges for each said candy cooking stage and each said fried food. The electronic thermometer also includes a temperature sensing probe projecting from the housing for obtaining temperature readings and transmitting the temperature readings to the controller, and a control interface provided on the housing and in communication with the controller for selectively activating either a first of the operational protocols for monitoring temperatures associated with the candy cooking stages or a second of the operational protocols for monitoring temperatures associated with the fried foods. The controller deactivates the second operational protocol when the first operational protocol is selected and deactivates the first operational protocol when the second operational protocol is selected.

29 Claims, 12 Drawing Sheets

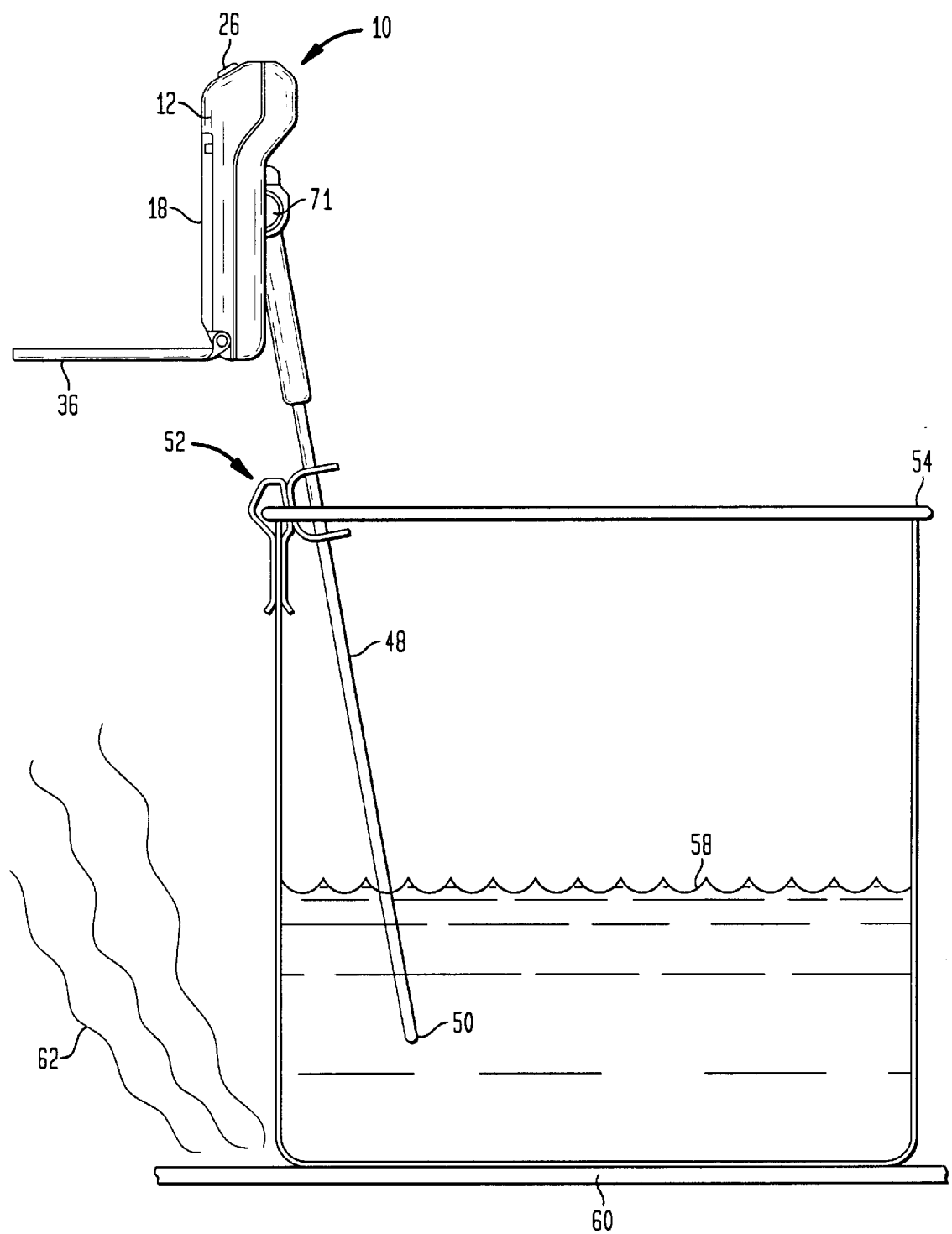

FIG. 5A

```
CANDY
TEMP. TABLE:
"OVER"              392F OR OVER
CARAMEL             320-350.0 F
HARD CRACK          300-310.0 F
SOFT CRACK          270-290.0 F
HARD BALL           260-265.0 F
FIRM BALL           245-250.0 F
SOFT BALL           235-240.0 F
THREAD              230-234.9 F
```

FIG. 5B

```
OIL
TEMP. TABLE:
"OVER"              392F OR OVER
FRENCH FRIES X 2    375-390.0 F
F. FISH FILLET      373-384.9 F
SEA FOODS           365-372.9 F
VEGETABLES          350-364.9 F
CHICKEN             350-364.9 F
FRENCH FRIES X 1    350-364.9 F
CHIP                320-347.9 F
```

ELECTRONIC CANDY AND OIL THERMOMETER

CROSS REFERENCE TO RELATED APPLICATIONS

The present application claims benefit of U.S. provisional application No. 60/283,503, filed Apr. 12, 2001, the disclosure of which is hereby incorporated by reference herein.

FIELD OF THE INVENTION

The present invention is directed to cooking thermometers and is particularly directed to electronic thermometers for cooking candy and fried foods to exacting temperatures.

BACKGROUND OF THE INVENTION

The utilization of a reliable, accurate thermometer is essential for successfully cooking candies and fried foods. When cooking certain types of candy, such as fudge, caramel, taffy, nougats, or hard candy such as brittles, or lollipops, it is critical that the sugar in the candy be formulated into stages known as thread, soft ball, firm ball, hard ball, soft crack and hard crack. As used herein, and as is well known to those skilled in the art, the above-mentioned stages refer to the concentration of the sugar once the water has been boiled off and the sugar melts and breaks down. Previously, the terms were associated with how the sugar would react with ice water. Today, however, the preferred method for checking the stage of the sugar is to check the temperature of the sugar. The temperature range for each stage is very specific. As such, it is critical that the sugar is heated to, but does not exceed, a relatively small temperature range. For example, sugar heated to the stage known as soft crack (used for taffy) must be heated to, but not rise above, a temperature range of 270–290° F. On the other hand, sugar heated to the stage known as hard crack (used for brittles) must be heated to a temperature range of between 300–310° F. If the cooking temperature of the sugar exceeds the preferred temperature for the particular type of candy being prepared, the quality, texture and/or taste of the candy rapidly diminishes.

The requirement that products be cooked to exacting temperatures is equally true for foods that are fried in oil, such as fried chicken and french fries. Fried foods that are not cooked to the correct temperature will taste greasy. On the other hand, fried foods that are cooked at excessive temperatures will be overcooked. The preferred cooking temperature range for fried chicken is approximately 350–364.9° F., while the optimum cooking temperature range for sea foods is approximately 365–372.9° F. Other fried foods have other temperature ranges that must be met with exacting standards.

One known candy and oil thermometer includes an elongated thermometer tube and a graduated scale fastened to the thermometer tube. The tube and the graduated scale are placed in a protective sleeve that is closed at both ends. The thermometer tube has a bulb that is fastened to the lower end of the protective sleeve by a mass of solder commonly called a tin anchor, usually comprising 50% tin and 50% lead. The tin anchor serves to provide good heat transfer between the outer protective sleeve and the thermometer bulb and also secures the thermometer to the protective sleeve.

Over the years, there have been many improvements in candy and oil thermometers. For example, U.S. Pat. No. 3,636,770 to Chaney discloses a candy thermometer in which the tin anchor is eliminated for reducing the manufacturing cost of the thermometer. In Chaney, the thermometer tube and the graduated scale are thermally coupled to one another by providing a resilient member that exerts a downward force on the graduated scale to retain a bulb of the thermometer in close contact with the bottom end of a protective tube that surrounds the thermometer.

Although the above-mentioned thermometers have proven to be somewhat effective in accurately measuring temperatures when cooking sugar to make candy and when heating oil to fry foods, there remains a need for improved thermometers for monitoring temperatures when making candies and frying foods in oil. Such thermometers should preferably include prompting mechanisms for alerting individuals and chefs when the desired temperature range has been reached. Such improved thermometers should also provide one or more indicators (e.g. visual and audible) that the desired temperature has been attained.

SUMMARY OF THE INVENTION

Certain preferred embodiments of the present invention disclose an electronic candy and oil thermometer including a housing, a temperature sensing probe projecting from the housing, a visual display such as a liquid crystal display (LCD) provided in the housing for displaying unique visual indicia associated with a plurality of different food types, a control interface provided in the housing in communication with the visual display, and a controller in communication with the temperature sensing probe, the visual display and the control interface. The controller preferably includes operating protocols and a memory for storing temperature ranges for the candy cooking stages and for fried foods. A control interface is provided on the housing and in communication with the controller for selectively activating either a first of the operational protocols for monitoring temperatures associated with the candy cooking stages or a second of the operating protocols for monitoring temperatures associated with the fried foods.

In preferred embodiments, the temperature-sensing probe projecting from the housing includes a rounded lower end. In other words, the lower end of the temperature-sensing probe is not sharpened to a point but has an obtuse or rounded end. In certain embodiments, the temperature-sensing probe includes a heat sensor at a lower end thereof, the heat sensor being electrically connected with the controller in the housing for transmitting temperature readings from the heat sensor to the controller. The housing includes the visual display, which in certain preferred embodiments is a liquid crystal display (LCD). The visual display provides a unique visual indicator for each of the food types provided thereon. The visual display may also include a temperature display area which displays the most recently obtained temperature reading. The temperature display area may also periodically display a final desired cooking temperature.

Preferred embodiments of the present invention are used for cooking various types of candy or for frying various types of food in oil. The candy/oil thermometer may be used to cook all types of candies. Preferred candies that may be cooked using the present invention include caramel, syrup, fudge, pralines, nougats, taffy, brittles, lollipops, flan, and caramel cages. Preferred foods that may be fried in oil using the present invention include french fries, potato chips, seafood, fish, vegetables and poultry.

The housing of the present invention may also include an audible signal indicator in communication with the controller for providing an audible signal when the optimal cooking temperature range for the selected candy stage or fried food has been attained. The housing also preferably includes the control interface having at least two data entry keys for selecting a particular type of candy cooking stage or fried food for which the temperature will be monitored. The data entry keys may also be used to select and set a final desired cooking temperature. The at least two data entry keys may include an On/Select key, and a Set key for selecting the candy cooking stage or fried food to be monitored or a final desired cooking temperature.

In operation, a chef will activate the electronic thermometer by depressing the On/Select key provided on the housing. The chef may selectively activate the operational protocols for the candy cooking stages and the fried foods by pressing the On/Select button. Each time the On/Select button is pushed, the controller will toggle back and forth between activating either the operational protocol for the candy cooking stages or the operational protocol for the fried foods. When one of the operational protocols is activated, the other operational protocol is deactivated. Thus, when the candy cooking stage operational protocol is activated, the fried food operational protocol is deactivated and vice versa. The chef may then depress the Set key one or more times to pan through the array of candy cooking stage or fried food choices displayed on the visual display. Once the desired candy stage or fried food has been highlighted on the visual display, the chef will preferably release the Set button on the housing, thereby selecting the type of candy stage or fried food being monitored.

When candy or fried food is cooked, the sensor at the lower end of the temperature sensing probe obtains temperature readings of the candy mixture or oil and transmits such readings to the controller within the housing. The temperature shown on the visual display is continuously updated to reflect the latest temperature reading. As the temperatures are recorded and relayed to the controller, the controller compares the latest sensed temperature to the temperature range for the candy stages or fried foods stored in memory for determining whether the temperature range for the selected candy stage or fried food has been reached. If the temperature range has been reached, the controller activates the visual display and/or audible indicator for the candy stage or fried food to produce a prompt signal discernable to a human. In other preferred embodiments, the housing may also include an audible signal-generating element such as a beeper, buzzer or speaker that is in communication with the controller. The audible sound-generating element preferably generates a sound such as a beep when the sensed temperature reading matches the optimum temperature range for the selected candy stage or fried food. Once the desired temperature range has been reached, the individual monitoring the cooking of the candy or fried food will preferably remove the cooked candy or fried food from the energy (e.g. flame). In other preferred embodiments, the energy level may be reduced so that the preferred temperature range is not exceeded. As a result, the final cooking temperature of the candy or fried food will not exceed the preferred cooking temperature range, and the housing will immediately generate a prompt signal when a preferred temperature range has been attained.

In certain preferred embodiments, a clip is secured to either the elongated temperature probe or the housing for securing the thermometer to a cooking instrument. In one highly preferred embodiment, a compression clip is secured to the elongated temperature probe. The compression clip preferably includes a clip portion securable over an edge of a cooking vessel and a compressible attachment flange secured to the clip. The compressible attachment flange has two wings that may be compressed toward one another, each wing having an opening, the openings being in substantial alignment with one another. The clip is preferably slidably attached to the probe by passing the lower end of the probe through the openings in the wings. The wings are compressed toward one another in order to slide the clip along the probe. When the clip is at a preferred height relative to the lower end of the probe, the wings are released whereupon they spring slightly away from one another for locking the clip in place along the length of the elongated probe. Although the present invention is not limited by any particular theory of operation, it is believed that providing a slidably adjustable clip will enable the lower tip end of the probe to be placed approximately 4060 mm from the bottom of a cooking vessel, thereby preventing the tip from contacting the bottom of the vessel. Such an event (i.e. tip touching bottom) could result in an incorrect temperature reading. Thus, the slidably adjustable clip enables the tip end of the probe to be placed in the liquid being heated, while maintaining the tip end out of contact with the bottom of the vessel. The slidably adjustable feature enables the temperature check to be used with vessels having different heights.

The electronic candy and oil thermometer also preferably includes a protective cover for selectively covering the visual display. The protective cover is movable between a first position in which the cover covers the visual display and a second open position in which the cover is moved away from the visual display so that an operator may observe the display. The cover is desirably made of a conductive material, such as stainless steel, that deflects heat away from the front face of the visual display when the protective cover is in the second open position. For example, if the thermometer of the present invention is placed in a cooking vessel overlying a gas flame, the protective cover will deflect the rising heat of the gas flame away from the front face of the visual display. Thus, the movable cover serves as a protective shield for protecting the visual display from damage due to heat or condensation. The protective cover is preferably hingedly connected to the housing so that the cover may swing between the first closed position and the second open position. The protective cover may be made of a conductive material such as stainless steel. In highly preferred embodiments, the lower end of the protective shield is hingedly connected to the housing and the conductive or protective shield is made of a stainless steel material. Preferred colors for the protective shield include silver. The housing is preferably made of a resilient plastic material. Preferred colors for the housing include the color white.

These and other preferred embodiments of the present invention will be described in more detail below.

BRIEF DESCRIPTION OF THE DRAWINGS

FIG. 2 shows the electronic thermometer of FIG. 1 secured to an edge of a cooking vessel by a slidably adjustable clip, in accordance with certain preferred embodiments of the present invention.

FIG. 5A shows a temperature table for cooking various type of candy, in accordance with certain preferred embodiments of the present invention.

FIG. 5B shows a temperature table for cooking various types of fried food in oil, in accordance with certain preferred embodiments of the present invention.

DETAILED DESCRIPTION OF PREFERRED EMBODIMENTS

Figure 1:
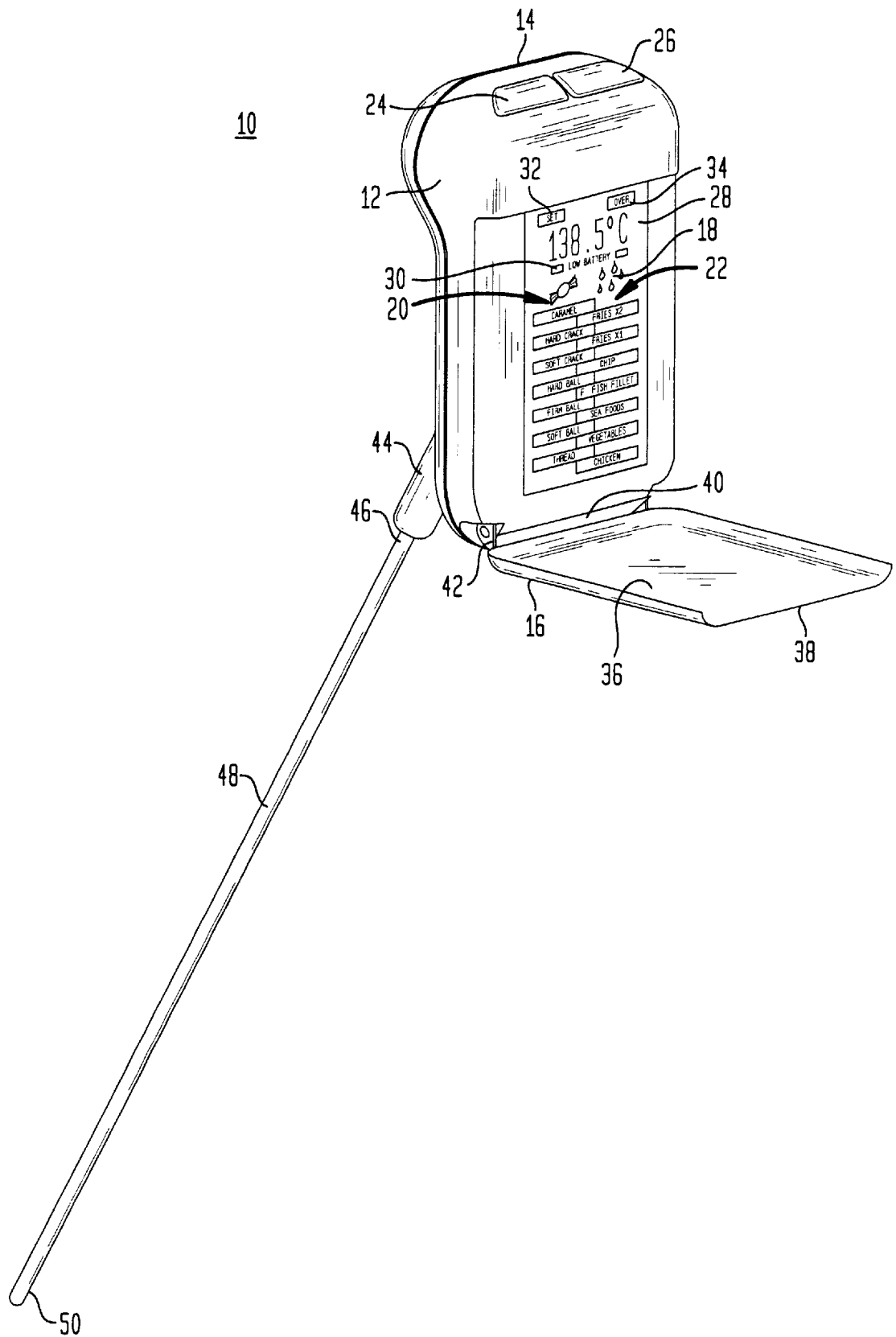
FIG. 1 shows a perspective view of an electronic thermometer having a protective cover and elongated temperature probe, in accordance with certain preferred embodiments of the present invention.

FIG. 1 shows an electronic thermometer preferably used for cooking candy or frying foods. The electronic thermometer 10 includes a housing 12 having an upper end 14 and a lower end 16 remote therefrom. The housing 12 includes a visual display 18, such as a liquid crystal display (LCD), having a first column of choices 20 identifying various types of candy and a second column of choices 22 identifying various types of food that may be fried in oil using the electronic thermometer 10. Housing 12 also includes an On/Select button 24 and a depressible Set button 26. The buttons 24, 26 are depressible for activating the electronic thermometer or selecting a candy or fried food for monitoring. The visual display 18 desirably has a temperature display region 28 that displays the most recently read temperature. Visual display 18 also includes a low battery indicator 30, a set indicator 32, and an "over" indicator 34 that provides a visual indication when the measured temperature exceeds the temperature window for the food or candy that has been selected or when an unsafe temperature has been measured (>392° F.). A protective shield 36, such as a stainless steel shield having a metallic outer surface, is hingedly connected to housing 12 for moving between a closed position and the open position shown in FIG. 1. The protective shield 36 includes an upper end 38, a lower end 40 remote therefrom, and a pair of projections 42 integrally connected to the lower end 40 for hingedly connecting lower end 40 of protective shield 36 to lower end 16 of housing 12.

Although not limited by any particular theory of operation, it is believed that protective shield 36, which is moveable between open and closed positions, serves as a heat shield that prevents heat from damaging visual display screen 18 and/or limits the likelihood that condensation will form over the visual display screen 18. Housing 18 includes a rearwardly extending projection 44 that is sized and shaped to receive an upper end 46 of an elongated temperature-sensing probe 48. The temperature sensing probe 48 is desirably elongated, has the upper end 46 secured to housing 12 and a lower end 50 having a heat sensor (not shown) provided therein. The lower end 50 of elongated temperature sensing probe 48 is preferably obtuse or rounded. Providing a rounded lower end 50 of elongated temperature sensing probe 48 is generally believed to cause less injuries than may result when using prongs having sharpened lower ends, such as the sharpened lower end of a meat thermometer.

Housing 18 desirable includes a controller (not shown) for operating one or more operating protocols. The controller is in communication with a memory device, the memory device having stored therein optimal cooking temperature ranges for the various types of candy cooking stages and fried foods listed on the visual display 18. In one particular preferred embodiment, the controller includes a plurality of operating protocols programmed therein. Depressing the On/Select button 24 one or more times activates the operating protocols. Each time the On/Select button 24 is depressed, the controller will toggle back and forth between a first operating protocol related to candy cooking stages and a second operating protocol related to fried foods. If a user desires to monitor candy cooking stages, the On/Select button 24 is depressed once and the controller defaults to the second operating protocol for fried foods. If the chef desires to use the first operating protocol for candy cooking stages, the chef depresses the On/Select button 24 a second time. Thus, each time the On/Select button 24 is depressed, the controller will toggle back and forth between the operational control protocol for the candy cooking stages and the operational protocol for the fried foods. After the operational protocol for the candy or fried foods has been selected, a user will then depress the set button 26 to select one of the candy stages or one or the fried foods. For example, if a user desires to select hard crack candy, a user will press the On/Select button 24 once to activate the thermometer, the On/Select button 24 a second time to toggle from the fried food protocol to the candy stage protocol, and then depress the set button 26 one or more times until the hard crack indicator on the visual display is highlighted. The electronic thermometer will then be immersed in a candy mixture and be activated for monitoring the temperature of the candy mixture. Once the temperature sensed by the temperature probe is within the preferred temperature range for hard crack, the housing will generate a visual and/or audible prompt message that may be observed by a user within the vicinity of the thermometer. The prompt message notifies the user that the preferred temperature range for hard crack candy has been attained and that the mixture may be removed from heat or the heat reduced in magnitude. A user may also manipulate the On/Select button 24 and Set button 26 to select a final desired cooking temperature. Once the desired cooking temperature has been attained, the thermometer will generate a visual and/or audible prompt message notifying a user that the desired temperature has been attained.

Referring to FIGS. 2 and 3A–3E, a preferred embodiment of the electronic thermometer may include a slidably adjustable clip adapted to secure electronic thermometer 10 over an edge 54 of a cooking vessel 56, such as the edge of a pot. Other cooking instruments may include frying pans, deep fat fryers, woks, etc. Before or after electronic thermometer 10 is secured to the edge 54 of pot 56, a user will activate the thermometer 10 by first moving protective shield 36 into the second open position shown in FIG. 2. After swinging protective shield 36 into the open position, a user will depress the On/Select button (not shown) to activate electronic cooking device 10. Upon depressing the On/Select button, visual display screen 18 will display all of the indicators for candy stages and fried foods for approximately 2–3 seconds. The controller will then default to the operating protocol for fried foods. A user may depress the set button 26 for panning through the various fried foods listed on the visual display 18. Once the desired fried food is highlighted on the visual display 18, a user will release set button 26, thereby selecting that fried food for monitoring. During this process, temperature display region 28 of visual display 18 will preferably show the most recently obtained temperature reading.

As shown in FIG. 2, the lowermost end 50 of elongated temperature sensing probe 48 is immersed in a candy mixture, oil or liquid 58 being heated atop range 60. As the range 60 emanates heat 62 for heating liquid 58, a portion of heat 62 flows along the sides of vessel 56 toward the housing 12 and visual display 18 of electronic cooking device 10. In order to avoid heat damage or condensation on the visual display, the present invention includes a pivotally attached protective shield 36 that may be maintained in an open position, as shown in FIG. 2, for deflecting the heat 62 away from the visual display 18.

Referring to FIGS. 3A–3E, slidably adjustable clip 52 includes a clip portion 53 having a closed upper end 55 and an open lower end 57. Clip 53 includes front wall 59 and rear wall 61 remote therefrom. Slidably adjustable clip 52 also includes a resilient flange 63 including an upper wing 65, a lower wing 67 and substantially aligned openings 69A, 69B for passing the probe through the upper and lower wings 65, 67. Resilient flange 63 is secured to rear wall 61 of the clip 53, preferably adjacent the upper end 55 thereof.

Figure 3A:
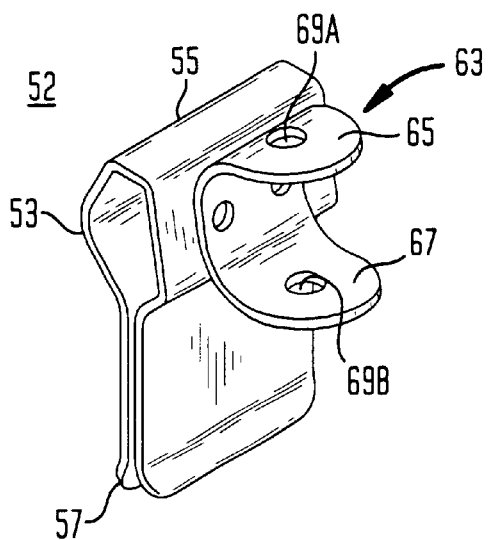
FIGS. 3A–3E show the compressible clip shown in FIG. 2.
Figure 3B:
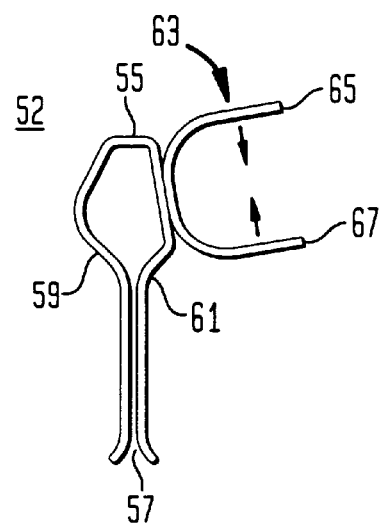
Figure 3C:
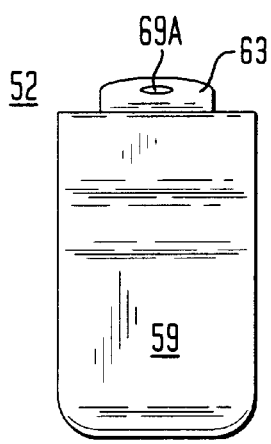
Figure 3D:
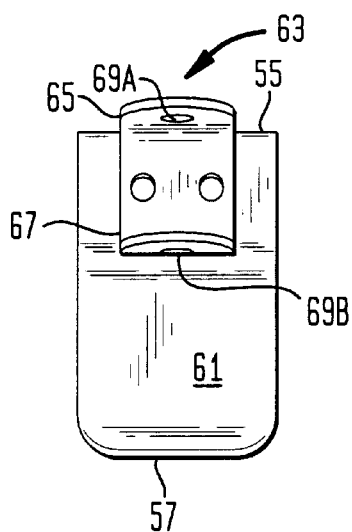
Figure 3E:
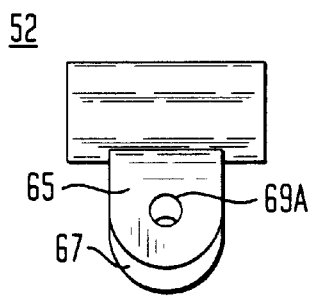

Referring to FIGS. 2 and 3B, the slidably adjustable clip may be slidably secured to probe 48 by passing the lower tip end of probe 48 through substantially aligned opening 69A, 69B. The opposing wings 65, 67 are preferably compressed toward one another for enabling the shaft of probe 48 to slide freely through substantially aligned opening 69A, 69B. Once the clip 52 has been positioned at a selected height above the lower end of probe 48, the resilient wing 65, 67 are released whereupon they spring back to their original position and move slightly away from one another. Upon springing back to their original position, the resilient wings prevent further sliding movement of clip 52 relative to probe 48. As a result, the clip is secured in one position along the length of probe 48. Although the present invention is not limited by any particular theory of operation, it is believed that providing a slidably adjustable clip will enable the electronic thermometer of the present invention to be utilized with cooking vessels having a wide variety of heights. As a result, the slidably adjustable clip may be positioned relative to the lower end of probe 48 so that the lower end does not contact a bottom of the cooking vessel. Thus, the tip end with the temperature sensor 50 will be positionable within a body of liquid 58, however, the tip end will be maintained out of contact with the bottom of vessel. As is known to those well skilled in the art, contact of the tip end of the temperature probe with the bottom of the vessel may result in an inaccurate temperature reading of the liquid 58, thereby adversely affecting the quality of the candy mixture or fried food being cooked.

Referring to FIG. 2, electronic thermometer 10 also preferably includes a pivotal attachment 71 secured adjacent an upper end of probe 48 so that housing 12 may be selectively pivoted relative to probe 48.

Once a user has selected a candy or fried food for monitoring, the sensor (not shown) at the lower end 50 of elongated temperature sensing probe 48 will continuously transmit the latest temperature reading to controller (not shown) within housing 12. The controller 12 will continuously compare the latest temperature reading to the optimum final temperature range for the candy cooking stage or fried food being monitored. Once the temperature reading obtained by the elongated temperature probe 48 is within the temperature range for the candy stage or fried food selected, the thermometer will provide a prompt message that the temperature range has been reached.

The electronic thermometer device 10 may also include a beeper or speaker for producing an audible prompt signal. Although not limited by any particular theory of operation, it is believed that providing the electronic thermometer 10 with both visual and audible prompt indicators will result in prompt and reliable notification when the desired temperature range has been reached. As a result, a user does not have to continuously monitor the thermometer, but is free to move about the vicinity of the thermometer while engaging in other activities. Thus, the chances of overcooking candy and/or fried foods is greatly diminished.

Figure 4A:
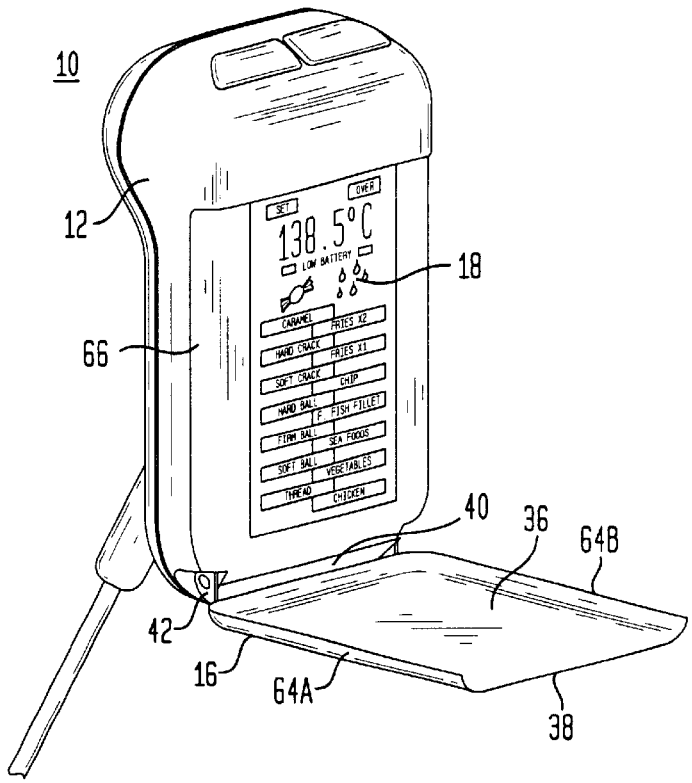
FIG. 4A shows the electronic thermometer of FIG. 1 having the protective cover in an open position.

FIG. 4A shows the electronic thermometer 10 with the protective shield 36 in an open position for allowing access to visual display screen 18. As noted above, protective shield is preferably made of a durable, conductive material such as stainless steel. In highly preferred embodiments, the exterior surface of the protective shield 36 is silver in color. Protective shield 36 includes an upper end, a lower end 40 and opposing sides 64 extending between the upper 38 and lower 40 ends. Protective shield 36 includes integrally attached projections 42 for pivotally securing lower end 40 of protective shield 32 to the lower end 16 of housing 12. The opposing sides 64A, 64B of protective shield are desirably curved for conforming to the curved face 66 at the lateral portions of visual display 18. The curved opposing sides 64A, 64B create a closer fit between protective shield 36 and visual display 18, and improves the aesthetic appearance of electronic thermometer 10. FIG. 3B shows the electronic thermometer 10 of FIG. 3A with protective shield 36 in a closed position for covering visual display 18 (FIG. 3A). The protective shield 36 is desirably placed in the closed position when electronic thermometer 10 is not in use and/or placed in storage. Thus, the protective shield 36 swings between an upwardly configured, closed position and a downwardly configured, open position.

Figure 4B:
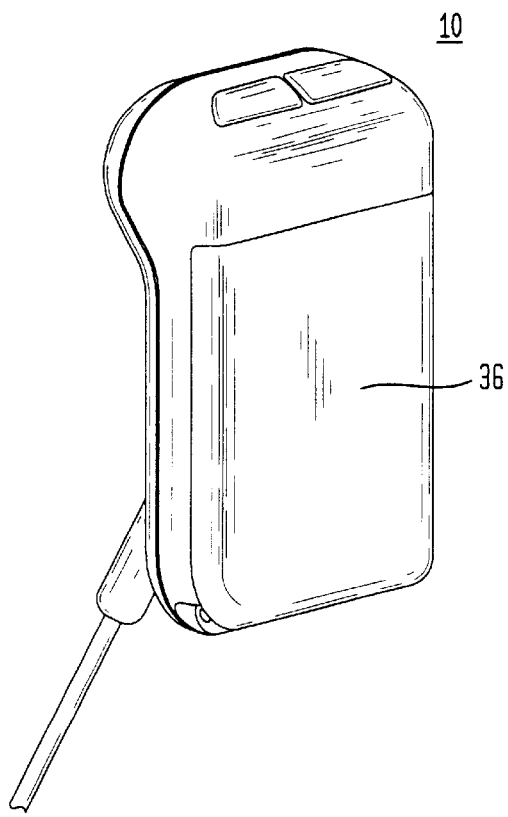
FIG. 4B shows the electronic thermometer of FIG. 3A with the protective cover in a closed position for covering a visual display.

FIG. 4 shows candy and oil temperature ranges for one 1 temperature ranges for one preferred embodiment of the present invention. The temperature ranges shown in FIG. 4 may vary based on taste preferences and environmental factors such as altitude.

Figure 6A:
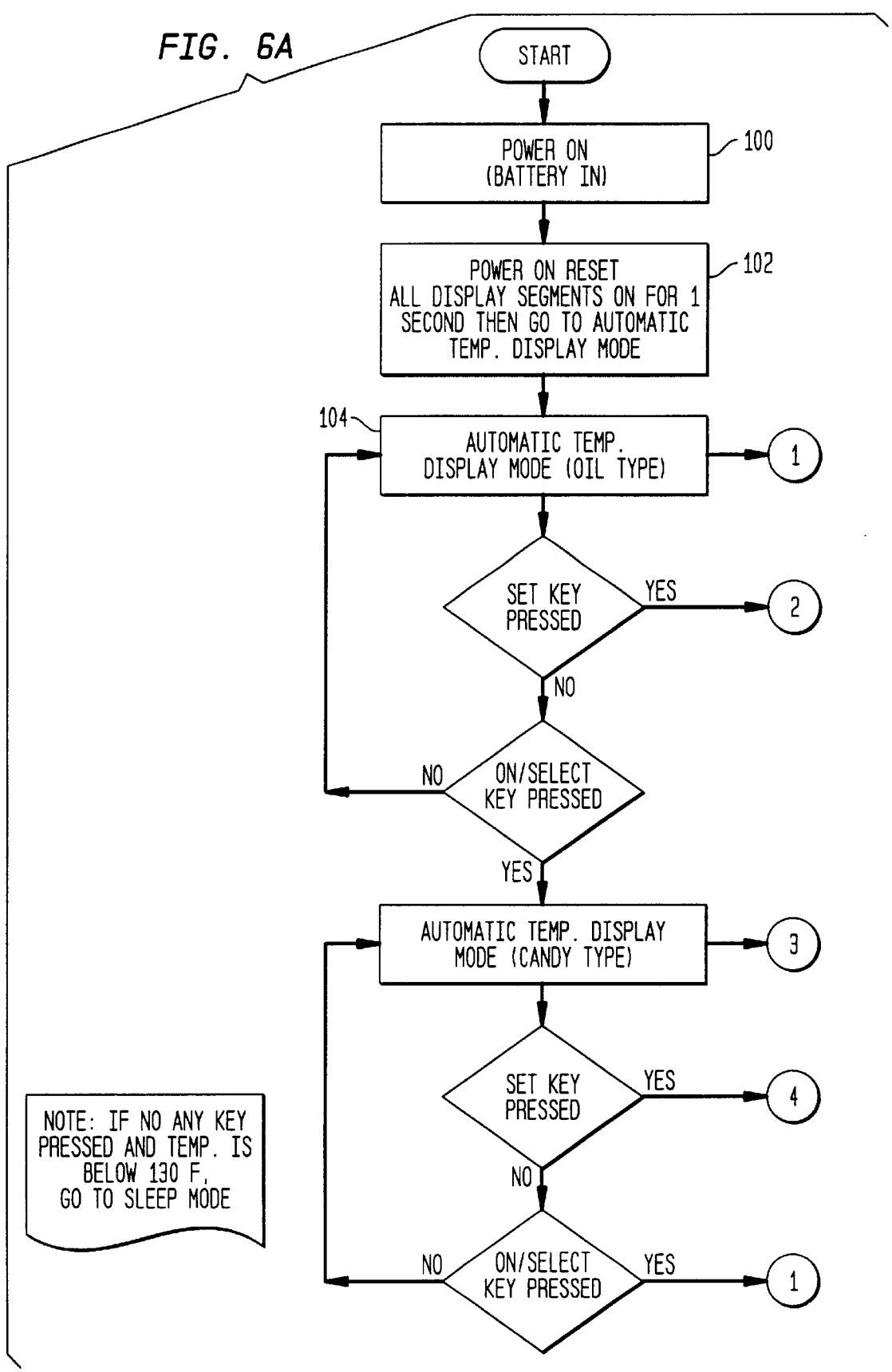
FIG. 6A shows a start-up protocol for an electronic thermometer, in accordance with further preferred embodiments of the present invention.
Figure 6B:
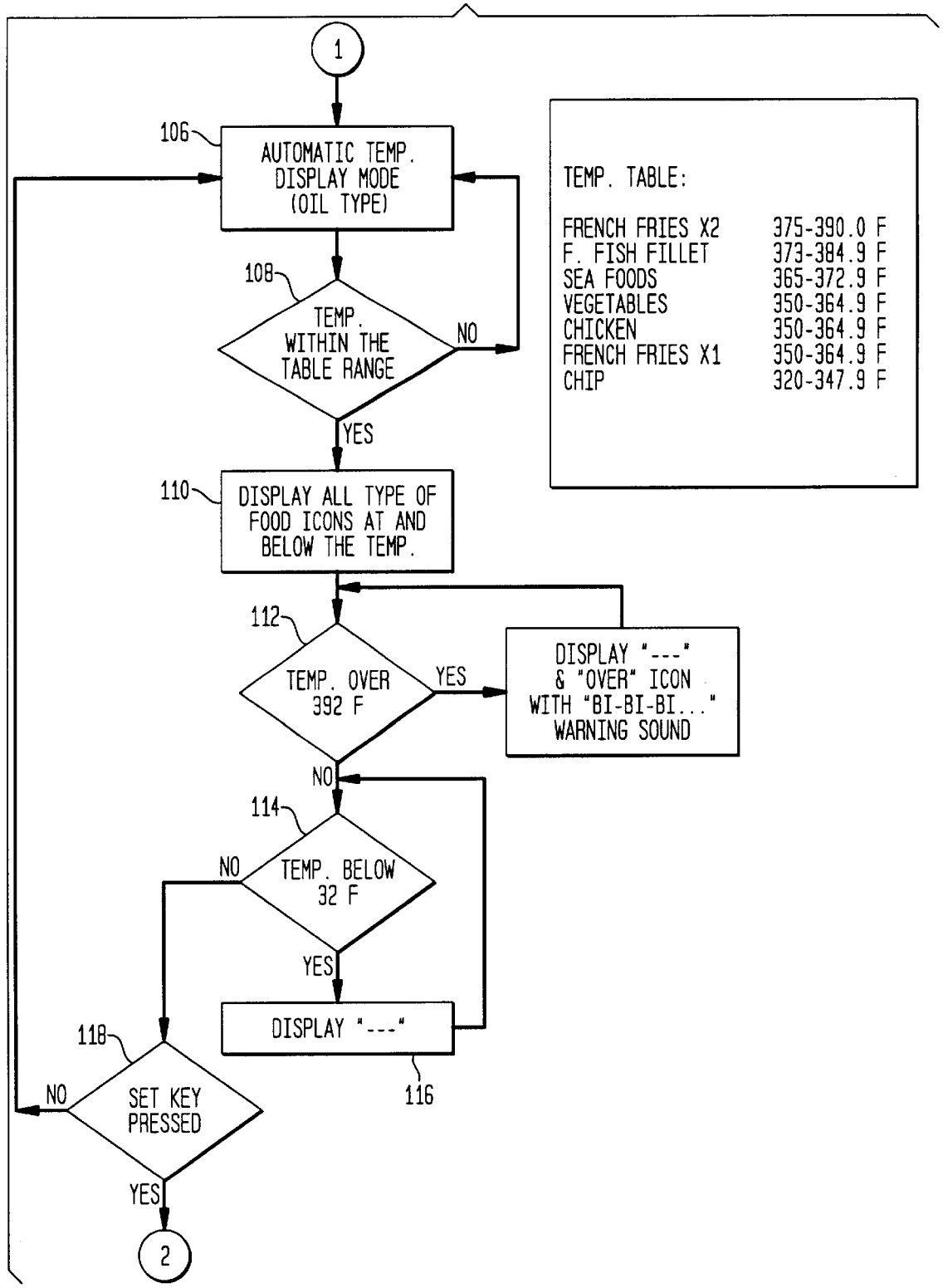
FIG. 6B shows an operational protocol for an electronic thermometer in an automatic temperature display mode (oil type), in accordance with certain preferred embodiments of the present invention.
Figure 6C:
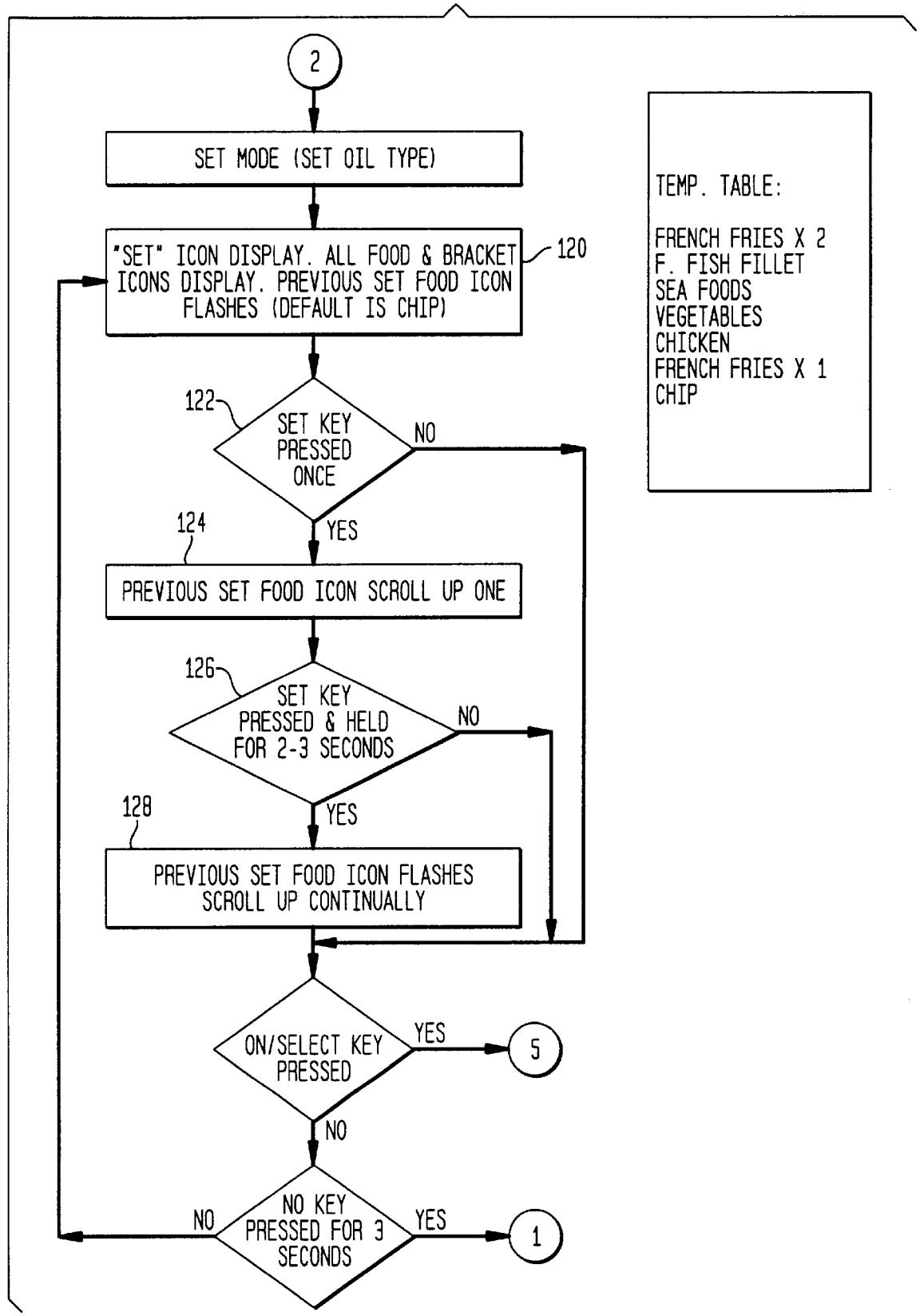
FIG. 6C shows an operational protocol for an electronic thermometer in a set mode (set oil type), in accordance with certain preferred embodiments of the present invention.

FIGS. 6A–6G show an operational protocol for an electronic candy and oil thermometer, in accordance with other preferred embodiments of the present invention. The operational protocol is preferably stored in the controller described above. Referring to FIGS. 1 and 6A, at step 100, a user depresses On/Select bottom 24 to activate the electronic thermometer 10. After the On/Select button 24 has been depressed, the controller activates all of the visual indicators in visual display 18 for approximately 1 second at step 102. If no further action is taken, the controller places the electronic thermometer in an automatic temperature display mode. The automatic temperature display mode (oil type) is shown at step 104. Referring to FIGS. 1 and 6B, in the automatic temperature display mode (oil type), the temperature of the oil is continuously monitored using temperature sensing probe 48 at step 106. At step 108, the controller continuously analyzes the temperature data to determine if the measured temperature is within one of the temperature ranges for a particular fried food such as french fries, fried fish fillet, seafoods, vegetables, chicken, or potato chips. At step 110, visual display 18 displays all types of fried foods having a temperature range that bounds the monitored temperature. For example, if the temperature probe 48 measures a temperature of 376° F., the fried food icons for french fries and fried fish fillet will be illuminated on display panel 18. If the measured temperature exceeds 392° F. (step 112), the controller will illuminate the "over" icon 34 and generate an audible sound such as "Bi-Bi-Bi . . . " In certain preferred embodiments, the temperature display region 28 will display "- - - " for indicating that the measured temperature has exceeded a maximum cooking temperature.

If the temperature is below 32° F. (step 114), the controller will display "- - - " at the temperature display region 28 of visual display 18 (step 116). If the set key 26 is depressed at step 118, the controller will utilize the set mode (set oil type) protocol shown at FIG. 6C. Each time the Set key 26 is pressed, the illuminated fried food icon scrolls up one position (step 124). For example, referring to the array of icons in FIG. 1, the first time the Set button 26 is pressed, the chicken icon will illuminate and will remain illuminated until the Set button 26 pressed once again. At that point, the chicken icon will be deactivated and the vegetable icon will illuminate, indicating that the vegetable temperature range has been selected. If the Set key 26 is pressed and held for 2–3 seconds (step 126), the previous set food icon will flash and the illuminated icons will scroll up continually at step 128.

Figure 6D:
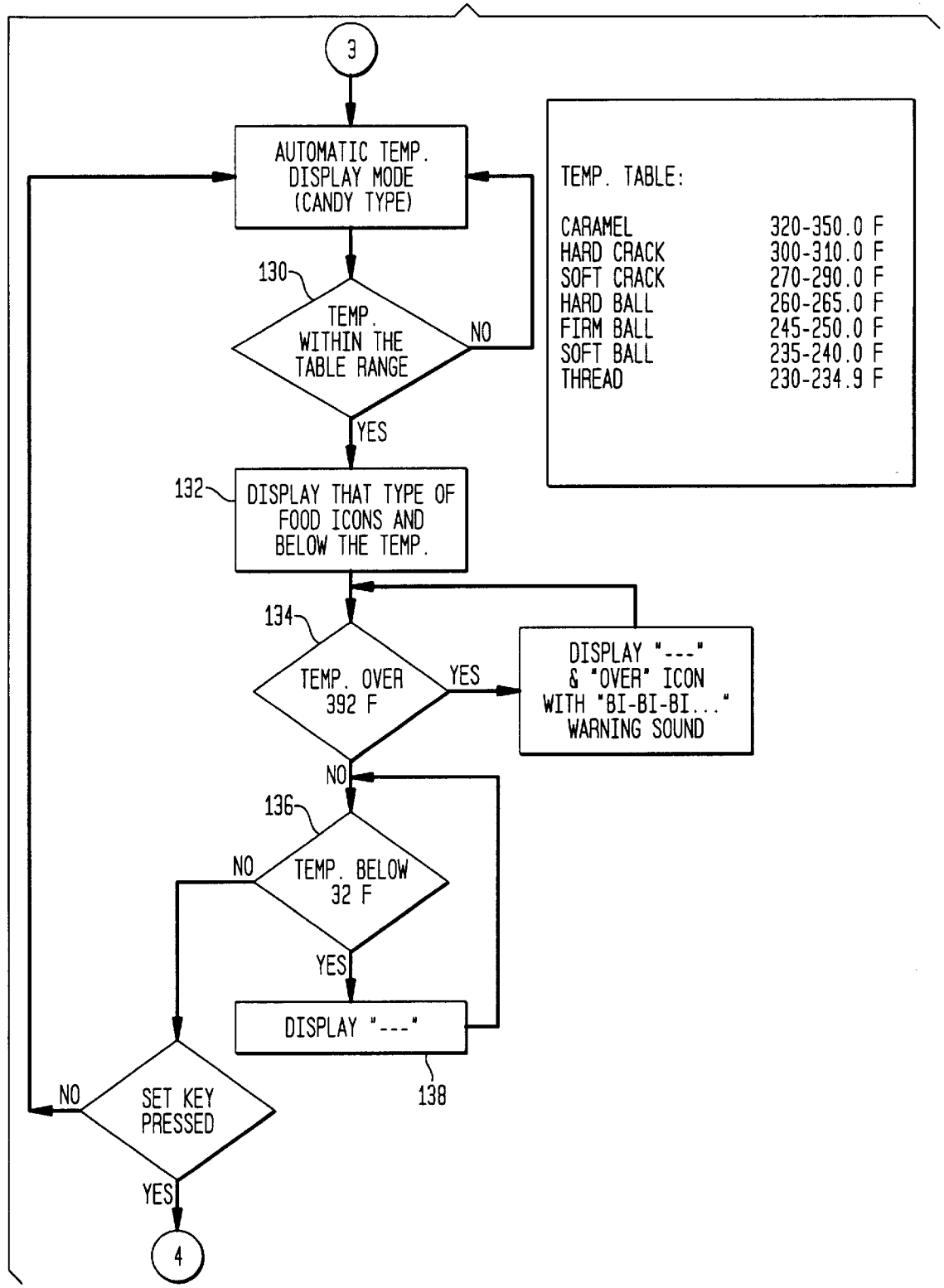
FIG. 6D shows an operational protocol for an electronic thermometer in an automatic temperature display mode (candy type), in accordance with certain preferred embodiments of the present invention.

Referring to FIGS. 1 and 6D, in the automatic temperature display mode (candy type), the electronic thermometer 10 illuminates a particular type of candy when the monitored temperature falls within the preferred temperature window for the candy type. At step 130, the temperature probe 148 monitors the temperature of the candy being prepared. If the measured temperature falls within one of the temperature ranges shown for caramel, hard crack, soft crack, hard ball, firm ball, soft ball and thread, the particular candy type will illuminate at step 132. For example, if the measured temperature is 305° F., the hard crack icon will be illuminated on visual display 18 to indicate that an unsafe temperature has been measured. At step 134, if the measured temperature exceeds 392° F., the temperature display region 28 will display and the "over" icon 34 will illuminate on visual display 18. In addition, the controller will generate an audible sound such as "Bi-Bi-Bi . . . " At step 136, if the monitored temperature is below 32° F., the temperature display region 28 of visual display 18 will display "- - - " at step 138.

Figure 6E:
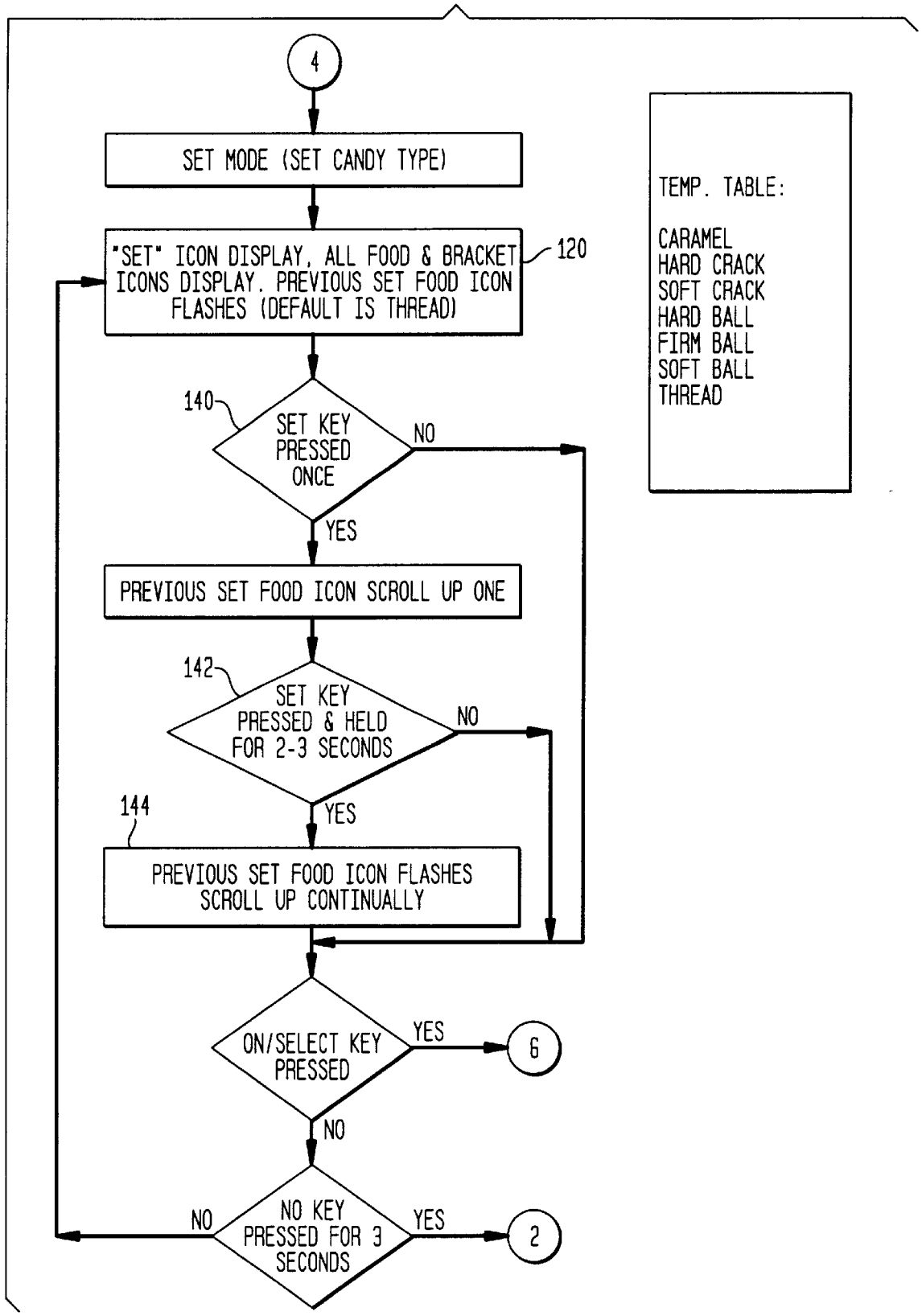
FIG. 6E shows an operational protocol for an electronic thermometer in a set mode (set candy type), in accordance with certain preferred embodiments of the present invention.

Referring to FIGS. 1 and 6E, in the set mode for selecting a particular candy cooking stage, a user presses Set key 26 one or more times to select a particular candy cooking stage for monitoring at step 140. Each time the Set key 26 is pressed, the indicator for the particular candy stage will scroll one position upward. The various candy cooking stages preferably include caramel, hard crack, soft crack, hard ball, firm ball, soft ball and thread. At step 142, if Set key 26 is pressed and held for approximately 2–3 seconds, the controller will automatically scroll upward through the various types of candy stages listed above with the last selected icon continuing to flash as the controller scrolls upwardly. As the scrolling takes place, the icon for the last selected candy stage will flash until the candy stage is selected at step 144.

Figure 6F:
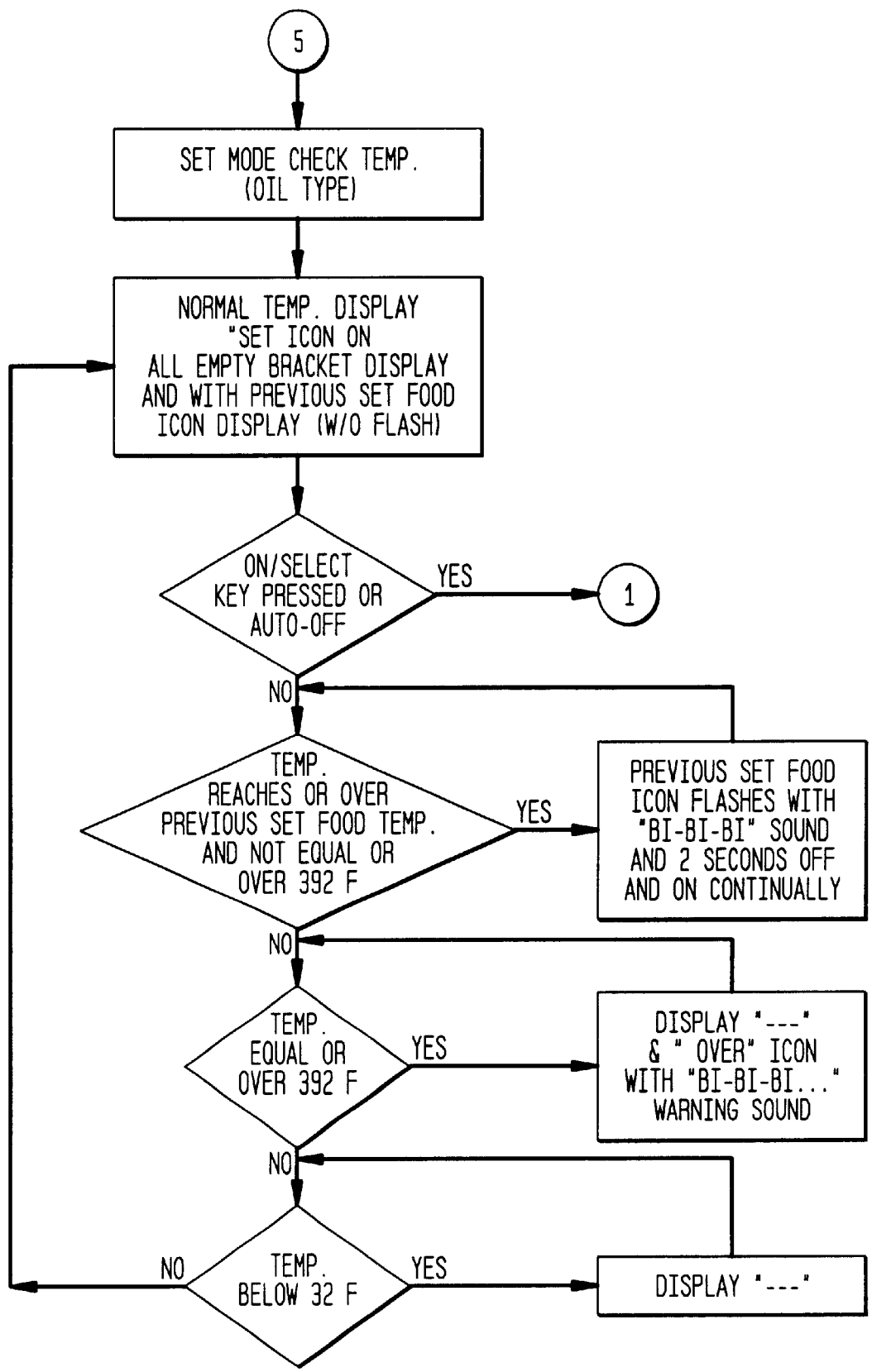
FIG. 6F shows an operational protocol for an electronic thermometer in a set mode check temperature (oil type), in accordance with certain preferred embodiments of the present invention.
Figure 6G:
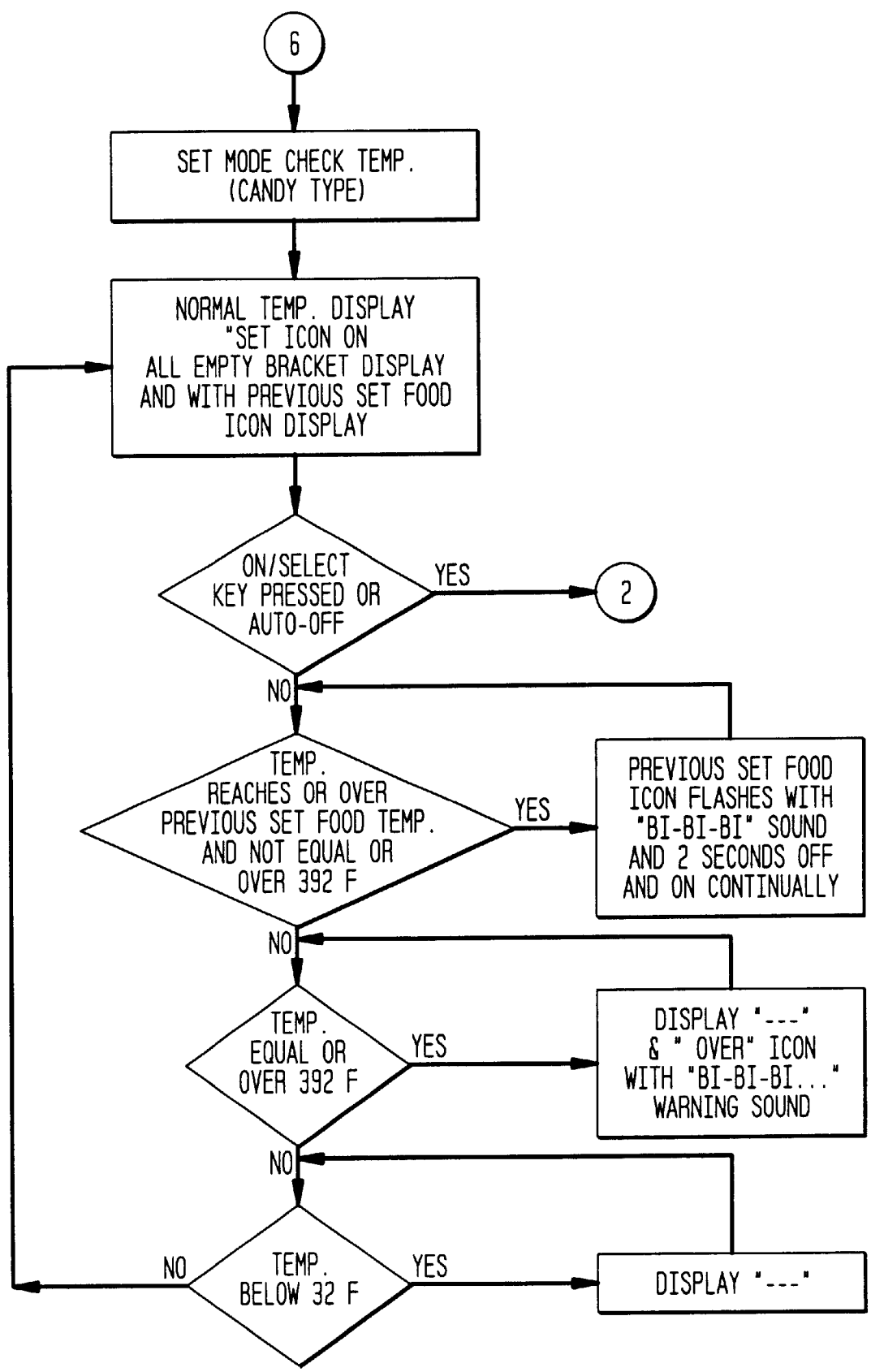
FIG. 6G shows an operational protocol for an electronic thermometer in a set mode check temperature (candy type), in accordance with certain preferred embodiments of the present invention.

FIG. 6F shows a preferred protocol for the electronic thermometer in the set mode check temperature (oil type). FIG. 6G shows a preferred protocol for the electronic thermometer in the set mode check temperature (candy type).

Although the present invention has been described with reference to particular preferred embodiments, it is to be understood that these preferred embodiments are merely illustrative of the principles and applications of the present invention. Thus, it should be evident to one skilled in the art that numerous modifications may be made to the preferred embodiments set forth herein and that other arrangements may be devised without departing from the spirit and scope of the present invention as defined by the appended claims.

What is claimed:

1. An electronic candy and oil thermometer comprising:
   a housing having a visual display for displaying indicia associated a plurality of candy cooking stages and a plurality of fried foods, said housing including a controller having operating protocols and a memory for storing predetermined optimal temperature ranges for each of said candy cooking stages and each of said fried foods;
   a temperature sensing probe projecting from said housing for obtaining temperature readings and transmitting said temperature readings to said controller; and
   a control interface provided on said housing and in communication with said controller for selecting either a first of said operational protocols for monitoring temperatures associated with said candy cooking stages or a second of said operational protocols for monitoring temperatures associated with said fried foods, wherein said controller deactivates said second operational protocol when said first operational protocol is selected and deactivates said first operational protocol when said second operational protocol is activated.

2. The electronic thermometer as claimed in claim 1, wherein said temperature sensing probe projects from a lower end of said housing.

3. The electronic thermometer as claimed in claim 1, wherein said temperature sensing probe has a rounded lower end.

4. The electronic thermometer as claimed in claim 1, wherein said temperature sensing probe includes a heat sensor at a lower end thereof.

5. The electronic thermometer as claimed in claim 1, wherein said visual display is a Liquid Crystal Display (LCD).

6. The electronic thermometer as claimed in claim 5, wherein said visual display includes a temperature display area for displaying the most recently recorded temperature or a final desired cooking temperature.

7. The electronic thermometer as claimed in claim 5, wherein said visual display has an over indicator for indicating that the sensed temperature is at or above a safe temperature level.

8. The electronic thermometer as claimed in claim 1, wherein said memory has stored therein temperature ranges for various said candy cooking stages.

9. The electronic thermometer as claimed in claim 8, wherein said candy cooking stages are selected from the group consisting of caramel, hard crack, soft crack, hard ball, firm ball, soft ball and thread.

10. The electronic thermometer as claimed in claim 1, wherein said memory has stored therein predetermined temperature ranges for said fried foods, said fried foods being selected from the group consisting of french fries, potato chips, fish, seafood, vegetables and poultry.

11. The electronic thermometer as claimed in claim 1, further comprising an audible signal indicator in communication with said controller for providing an audible signal when the sensed temperature reading falls within one of said temperature ranges for said candy cooking stages and said fried foods.

12. The electronic thermometer as claimed in claim 1, wherein said control interface includes two or more data entry keys for selecting either candy cooking stages or fried foods for temperature monitoring.

13. The electronic thermometer as claimed in claim 12, wherein said data entry keys include a depressible key for selecting a final cooking temperature.

14. The electronic thermometer as claimed in claim 13, wherein said controller is adapted to initiate a prompt message when said final cooking temperature has been attained.

15. The electronic thermometer as claimed in claim 1, wherein said data entry keys include an On/Select key for activating either the first operational protocol for said candy cooking stages or the second operational protocol for said fried foods.

16. The electronic thermometer as claimed in claim 1, further comprising a clip slidably attached to said probe for selectively securing said electronic thermometer to an edge of a cooking vessel, wherein the position of said clip relative to a lower end of said probe is adjustable for controlling a distance between the lower end of said probe and a bottom of said cooking vessel.

17. The electronic thermometer as claimed in claim 16, wherein said clip is positioned along said probe and attached to the edge of said vessel so that the lower end of said probe is immersed is a liquid is said vessel and remote from the bottom of said vessel.

18. The electronic thermometer as claimed in claim 1, further comprising a protective cover hingedly secured to said housing, said protective cover movable between a first closed position for covering said visual display and a second open position for providing visual access to said visual display.

19. The electronic thermometer as claimed in claim 18, wherein said protective cover in said second open position deflects heat away from said visual display.

20. The electronic thermometer as claimed in claim 19, wherein a lower end of said protective cover is secured to a lower end of said housing.

21. The electronic thermometer as claimed in claim 1, wherein said housing is pivotable relative to an upper end of said temperature probe.

22. An electronic candy and oil thermometer for monitoring cooking of candy and fried foods comprising:

a housing having a temperature sensing probe projecting from a lower end thereof;

a temperature sensor disposed within said temperature sensing probe;

a visual display provided on said housing, said visual display having indicators for a plurality of candy cooking stages and fried foods, each said food type having an optimal cooking temperature range associated therewith;

a controller in communication with said temperature sensor for receiving sensed temperatures from said sensor, said controller including a memory for storing the optimum cooking temperature ranges for each of said candy cooking stages and said fried foods, said controller including an interface for activating a first operational protocol for said candy cooking stages and a second operational protocol for said fried foods; and a protective cover secured to said housing movable between a first closed position for covering said visual display and a second open position for providing access to said visual display.

23. The electronic thermometer as claimed in claim 22, wherein said protective cover is said second open position deflects heat and condensation away from said visual display.

24. The electronic thermometer as claimed in claim 22, wherein said indicator includes an audible indicator.

25. The electronic thermometer as claimed in claim 22, further comprising a clip slidable attached to said probe for securing said thermometer to an edge of a cooking vessel.

26. An electronic candy and oil thermometer for monitoring cooking of candy and fried foods comprising:

a housing having a temperature sensing probe projecting from a lower end thereof;

a temperature sensor disposed within said temperature sensing probe;

a visual display provided on said housing, said visual display having indicators for a plurality of candy cooking stages and fried foods, each said food type having an optimal cooking temperature range associated therewith;

a controller in communication with said temperature sensor for receiving sensed temperatures from said sensor, said controller including a memory for storing the optimum cooking temperature ranges for each of said candy cooking stages and said fried foods, said controller including an interface for activating a first operational protocol for said candy cooking stages and a second operational protocol for said fried foods; and a clip slidably attached to said probe for securing said electronic thermometer to an edge of a cooking vessel.

27. The electronic thermometer as claimed in claim 26, wherein said clip includes a compressible flange including opposing resilient wings having substantially aligned openings, said probe being passable through said substantially aligned openings, said wings being compressible toward one another for adjusting the position of said clip relative to a lower end of said probe.

28. The electronic thermometer as claimed in claim 26, wherein said clip is selectively positionable relative to a lower end of said probe for adjusting a distance between the lower end of said probe and a bottom of said cooking vessel.

29. The electronic thermometer as claimed in claim 26, further comprising a protective cover secured to said housing movable between a first closed position for covering said visual display and a second open position for providing access to said visual display.

* * * * *

UNITED STATES PATENT AND TRADEMARK OFFICE
CERTIFICATE OF CORRECTION

PATENT NO. : 6,501,384 B2
DATED : December 31, 2002
INVENTOR(S) : Peter A. Chapman and Hughes Sanoner It is certified that error appears in the above-identified patent and that said Letters Patent is hereby corrected as shown below:

Column 1,
Line 45, "french" should read -- French --.

Column 2,
Line 62, "french" should read -- French --.

Column 4,
Line 14, "4060" should read -- 40-60 --.

Column 7,
Line 44, "wing" should read -- wings --.

Column 8,
Line 6, after "controller" insert -- 12 --.
Line 29, after "shield" insert -- 36 --.
Line 37, "32" should read -- 36 --.
Line 38, after "shield" insert -- 36 --.
Line 51, delete "one 1".

Column 9,
Line 7, "french" should read -- French --.
Lind 30, after "26" insert -- is --.
Line 51, after "display" insert -- --- --.

Column 10,
Line 22, after "associated" insert -- with --.

Column 11,
Line 4, "french" should read -- French --.
Line 36, "is" should read -- in --. (second occurrence)
Line 36, "is" should read -- in --. (third occurrence)

UNITED STATES PATENT AND TRADEMARK OFFICE
CERTIFICATE OF CORRECTION

PATENT NO. : 6,501,384 B2
DATED : December 31, 2002
INVENTOR(S) : Peter A. Chapman and Hughes Sanoner It is certified that error appears in the above-identified patent and that said Letters Patent is hereby corrected as shown below:

<u>Column 12,</u>
Line 15, "is" should read -- in --.

Signed and Sealed this

Thirtieth Day of September, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,501,384 B2 | Page 1 of 1 |
| DATED | : December 31, 2002 | |
| INVENTOR(S) | : Peter A. Chapman and Hughes Sanoner | |

It is certified that error appears in the above-identified patent and that said Letters Patent is hereby corrected as shown below:

<u>Title page,</u>
Item [73], add the following assignee -- Maverick Industries, Inc. of Edison, New Jersey --.
Item [74], add the following *Attorney, Agent or Firm* -- Lerner, David, Littenberg, Krumholz & Mentlik, LLP --.

Signed and Sealed this

Sixteenth Day of December, 2003

JAMES E. ROGAN
*Director of the United States Patent and Trademark Office*